United States Patent
Tseng et al.

(10) Patent No.: US 11,027,470 B1
(45) Date of Patent: Jun. 8, 2021

(54) MOLDING SYSTEM FOR PREPARING INJUECTION-MOLDED ARTICLE

(71) Applicant: CORETECH SYSTEM CO., LTD., Zhubei (TW)

(72) Inventors: Huan-Chang Tseng, Zhubei (TW); Rong-Yeu Chang, Zhubei (TW); Chia-Hsiang Hsu, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 0 days.

(21) Appl. No.: 17/091,511

(22) Filed: Nov. 6, 2020

Related U.S. Application Data

(60) Provisional application No. 63/039,733, filed on Jun. 16, 2020.

(51) Int. Cl.
*B29C 45/76* (2006.01)
*B29C 45/50* (2006.01)
*B29C 45/60* (2006.01)
*B29C 45/62* (2006.01)
*B29C 45/00* (2006.01)

(52) U.S. Cl.
CPC ...... *B29C 45/5008* (2013.01); *B29C 45/0001* (2013.01); *B29C 45/60* (2013.01); *B29C 45/62* (2013.01); *B29C 45/7646* (2013.01)

(58) Field of Classification Search
CPC .............. B29C 45/00; B29C 2045/002; B29C 45/0025; B29C 2045/0098; B29C 45/0005; B29C 45/03; B29C 45/0046; B29C 45/7646
See application file for complete search history.

(56) References Cited

U.S. PATENT DOCUMENTS 5,770,131 A * 6/1998 Bubel ................. B29C 45/0082
264/69
9,283,695 B1 * 3/2016 Tseng .................. B29C 33/3835
(Continued)

OTHER PUBLICATIONS

Bird et al., "Dynamics of Polymeric Liquids: Fluid Mechanics" (Wiley-Interscience, New York, 1987), p. 351.
(Continued)

*Primary Examiner* — Joseph S Del Sole
*Assistant Examiner* — Thu Khanh T Nguyen
(74) *Attorney, Agent, or Firm* — Muncy, Geissler, Olds and Lowe, P.C.

(57) ABSTRACT

A molding system includes a molding machine having a screw, a driving motor driving the screw to move a molding resin; a mold disposed on the molding machine and connected to the barrel of the molding machine to receive the molding resin, and having a mold cavity with a die swell structure for being filled with the molding resin; a processing module simulating a filling process of the molding resin from the barrel into the molding cavity based on a molding condition including a predetermined screw speed for the molding machine; and a controller operably communicating with the molding machine to control the driving motor of the molding machine based on the molding conditions to move the screw at the predetermined screw speed to transfer the molding resin at a corresponding flow rate to perform an actual molding process for preparing the injection-molded article.

10 Claims, 12 Drawing Sheets

(56) References Cited

U.S. PATENT DOCUMENTS

| | | | |
|---|---|---|---|
| 2003/0141613 A1* | 7/2003 | Hajduk | B01J 19/0046 |
| | | | 264/40.3 |
| 2007/0216055 A1* | 9/2007 | Pilavdzic | B29C 45/78 |
| | | | 425/547 |
| 2018/0181694 A1* | 6/2018 | Springer | B29C 45/766 |

OTHER PUBLICATIONS

Schweizer, T., "Measurement of the First and Second Normal Stress Differences in a Polystyrene Melt with a Cone and Partitioned Plate Tool," Rheol Acta, 41, (2002), pp. 337-344, 8 pages.

Chang et al., "Numerical simulation of mold filling in injection molding using a three-dimensional finite volume approach," International Journal for Numerical Methods in Fluids vol. 37, Issue 2, pp. 125-148, Sep. 30, 2001, 24 pages.

Morrison, F.A., Understanding Rheology (Oxford University, 2001), p. 360.

Cross, M. M., "Relation between Viscoelasticity and Shear-Thinning Behaviour in Liquids," Rheol Acta, 18, (1979), pp. 609-614, 6 pages.

White et al., "Development of Constitutive Equations for Polymeric Melts and Solutions," J Appl Polym Sci 7 (1963), pp. 1867-1889, 23 pages.

Tseng, H.-C., "A Revisitation of Generalized Newtonian Fluids," J Rheol, 64, 493 (2020), pp. 493-504, 13 pages.

* cited by examiner

MOLDING SYSTEM FOR PREPARING INJUECTION-MOLDED ARTICLE

CROSS-REFERENCE TO RELATED APPLICATION

This application claims the benefit of U.S. Provisional Patent Application No. 63/039,733 filed Jun. 16, 2020, which is incorporated herein by reference in its entirety.

TECHNICAL FIELD

The present disclosure relates to a molding system for preparing an injection-molded article, and more particularly, to an injection-molding system for preparing an injection-molded article using a computer-aided engineering (CAE) simulation.

DISCUSSION OF THE BACKGROUND

Applications for polymers and plastics can be found in most areas of daily life due to their versatility and economic viability in the manufacturing industry. In plastics manufacturing, the actual flow of polymer melts is transient, non-Newtonian and non-isothermal, with frozen layers building up as the complex mixture flows through the mold cavity. Characteristics of a finished product are determined by many complex factors, such as changes in the direction of flow, inclusion of ribs, and changes in thickness and holes. To control the quality of the products, a deep understanding of complicated flow fields is critical. Nowadays, computer-aided engineering (CAE) software provides realistic simulation and predictive analysis for complex flows of complex fluids.

Viscoelasticity is a primary material property of polymer melts that exhibit both viscous and elastic characteristics. The die swell effect is important to understand for viscoelastic fluids. According to results of academic research of fluid mechanics and rheology, the White-Metzner constitutive equation is a nonlinear viscoelastic model of the generalized Newtonian fluids (GNF) available in polymer processing flows.

In practice, with the White-Metzner model, it is difficult to simulate that the die swell ratio of polymer melts is increased with the average flow rate or the wall shear rate. This can be attributed to three critical problems with the White-Metzner constitutive equation. In this model, the modulus parameter cannot be determined by experimental data. The extension viscosity can become a divergent risk at high extension rates. Moreover, although the first normal stress difference can be given, the second normal stress difference is zero and not described by the model. To resolve such significant issues, the present disclosure proposes modifications to the White-Metzner constitutive equation to simulate the die swell effect. This is based on extensive research of complex viscoelastic phenomena related to the die swell of viscoelastic fluids.

This Discussion of the Background section is provided for background information only. The statements in this Discussion of the Backgroundare not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing an injection-molded article, comprising a molding machine, including a barrel, a screw mounted for moving within the barrel, a driving motor driving the screw to move a molding resin; a mold disposed on the molding machine and connected to the barrel of the molding machine to receive the molding resin, and having a mold cavity with a die swell structure for being filled with the molding resin; a processing module simulating a filling process of the molding resin from the barrel into the molding cavity based on a molding condition including a predetermined screw speed for the molding machine, wherein simulating the filling process of the molding resin is performed taking into consideration of a die swell effect of the molding resin; and a controller operably communicating with the processing module to receive the molding conditions and with the molding machine to control the driving motor of the molding machine based on the molding conditions to move the screw at the predetermined screw speed to transfer the molding resin at a corresponding flow rate to perform an actual molding process for preparing the injection-molded article.

In some embodiments, the die swell effect of the molding resin is represented by an expression:

$$\frac{Wi(\dot{\gamma})}{\dot{\gamma}} \overset{\triangledown}{\tau}^* + \tau = 2\eta_W(\dot{\gamma})D$$

where $\tau$ represents a stress distribution, $\overset{\triangledown}{\tau}^*$ represents a rate of change of the stress distribution, $Wi(\dot{\gamma})$ represents an viscoelastic property of the molding resin, $\eta_W(\dot{\gamma})$ represents the weighted viscosity distribution of the molding resin, $D$ represents a rate of deformation of the molding resin, and $\dot{\gamma}$ represents a shear rate of the molding resin.

In some embodiments, the rate of change of the stress distribution is represented by an expression:

$$\overset{\triangledown}{\tau}^* = \frac{D\tau}{Dt} - \nabla L \cdot \tau - \tau \cdot L^T$$
$$L = \nabla u - \xi D$$

where $\nabla u$ represents the standard velocity gradient tensor (the rate of deformation), $L$ represents an effective velocity gradient tensor, and $\xi$ represents an effective factor.

In some embodiments, the effective factor is related to the shear rate of the molding resin, and the effective factor is represented by an expression:

$$\xi(\dot{\gamma}) = \frac{\xi_0}{\left[1 + \left(\frac{\dot{\gamma}}{\dot{\gamma}_{XC}}\right)^2\right]^{N_X}}$$

where $\xi_0$, $\dot{\gamma}_{XC}$, and $N_X$ represent parameters determined by using an experimental data.

In some embodiments, the viscoelastic property of the molding resin is related to the shear rate of the molding resin, and the viscoelastic property of the molding resin is represented by an expression:

$$Wi(\dot{\gamma}) = \frac{Wi_0}{\left[1+\left(\frac{\dot{\gamma}}{\dot{\gamma}_{WC}}\right)^{-2}\right]^{N_W}}$$

where $Wi_0$, $\dot{\gamma}_{WC}$, and $N_W$ represent parameters determined by using an experimental data.

In some embodiments, the weighted viscosity distribution of the molding resin is represented by an expression:

$$\eta_W = (1-W)\eta_S + W\eta_E$$

$$W = \frac{\dot{\gamma}_E^2}{\dot{\gamma}_T^2}$$

$$\dot{\gamma}_T^2 = \dot{\gamma}_S^2 + \dot{\gamma}_E^2$$

where W represents a weighting function, $\eta_S$ represents a shear viscosity of the molding resin, $\eta_E$ represents an extension viscosity of the molding resin, $\dot{\gamma}_T$ represents a total strain rate of the molding resin, $\dot{\gamma}_S$ represents a characteristic shear rate of the molding resin, and $\dot{\gamma}_E$ represents a characteristic extension rate of the molding resin.

In some embodiments, the viscoelastic property of the molding resin is determined by using an experimental data of a first normal stress difference represented by an expression:

$$N_1 = 2Wi\tau_{12}$$

$$\tau_{12} = \frac{\eta_S \dot{\gamma}}{1 + W_i^2(1-C_N^2)}$$

$$C_N(\dot{\gamma}) = 1 - \xi(\dot{\gamma})$$

where $\tau_{12}$ represents a shear viscosity of the molding resin.

In some embodiments, the effective factor is determined by using an experimental data of a first normal stress difference and a second normal stress difference represented by an expression:

$$N_1 = 2Wi\tau_{12}$$

$$N_2 = -\frac{\xi}{2}N_1$$

where $\tau_{12}$ represents a shear viscosity of the molding resin.

In some embodiments, the first normal stress difference is related to the shear viscosity of the molding resin.

In some embodiments, the second normal stress difference has a non-zero value.

In some embodiments, the molding resin comprises polystyrene resin.

In some embodiments, the die swell effect of the molding resin is represented by an expression:

$$\frac{Wi(\dot{\gamma})}{\dot{\gamma}}\overset{\nabla}{\tau}^* + \tau = 2\eta_W(\dot{\gamma})D$$

where $\tau$ represents a stress tensor (stress distribution), $\overset{\nabla}{\tau}^*$ represents the effective upper convected time derivative of the stress tensor (the rate of change of the stress distribution), $Wi(\dot{\gamma})$ represents the Weissenberg number, $\eta_W(\dot{\gamma})$ represents the weighted viscosity distribution of the molding resin, D represents a rate of deformation of the molding resin, and $\dot{\gamma}$ represents a shear rate of the molding resin.

In some embodiments, the effective upper convected time derivative of the stress tensor is represented by an expression:

$$\overset{\nabla}{\tau}^* = \frac{D\tau}{Dt} - \nabla L \cdot \tau - \tau \cdot L^T$$

$$L = \nabla u - \xi D$$

where $\nabla u$ represents the standard velocity gradient tensor (the rate of deformation), L represents an effective velocity gradient tensor (velocity gradient distribution), $\xi$ represents an effective factor, and $\xi D$) represents a retardation effect to the rate of deformation (slowing down the predicted rate of deformation).

In some embodiments, the effective factor $\xi$ is related to the shear rate of the molding resin, and the effective factor is represented by an expression:

$$\xi(\dot{\gamma}) = \frac{\xi_0}{\left[1+\left(\frac{\dot{\gamma}}{\dot{\gamma}_{WC}}\right)^2\right]^{N_X}}$$

where $\xi_0$, $\dot{\gamma}_{XC}$, and $N_X$ represent parameters determined by using an experimental data. In some embodiments, the above relation of the effective factor improves to predict the rate of change of the stress distribution at low shear rate.

In some embodiments, the Weissenberg number is related to the shear rate of the molding resin, and the Weissenberg number is represented by an expression:

$$Wi(\dot{\gamma}) = \frac{Wi_0}{\left[1+\left(\frac{\dot{\gamma}}{\dot{\gamma}_{WC}}\right)^{-2}\right]^{N_W}}$$

where $Wi_0$, $\dot{\gamma}_{WC}$, and $N_W$ represent parameters determined by using an experimental data. In some embodiments, the Weissenberg number represents the viscoelastic property of the molding resin, and the above relation increases the viscous weight of the Weissenberg number, improving the prediction of the Weissenberg number at low shear rate region.

In some embodiments, the overall (weighted) viscosity distribution of the molding resin is represented by an expression:

$$\eta_W = (1-W)\eta_S + W\eta_E$$

$$W = \frac{\dot{\gamma}_E^2}{\dot{\gamma}_T^2}$$

$$\dot{\gamma}_T^2 = \dot{\gamma}_S^2 + \dot{\gamma}_E^2$$

where W represents a weighting function, $\eta_S$ represents a shear viscosity of the molding resin, $\eta_E$ represents an extension viscosity of the molding resin, $\dot{\gamma}_T$ represents a total strain rate of the molding resin, $\dot{\gamma}_S$ represents a characteristic shear rate of the molding resin, and $\dot{\gamma}_E$ represents a characteristic extension rate of the molding resin. In some embodiments, the above relation of the weighted viscosity distribution of the molding resin takes into consideration the extension viscosity of the molding resin in addition to the conventional shear viscosity of the molding resin, improving the prediction of the real viscosity of the molding resin in the die swell structure of the mold cavity.

In some embodiments, the Weissenberg number is determined by using an experimental data of a first normal stress difference represented by an expression:

$$N_1 = 2Wi\tau_{12}$$
$$\tau_{12} = \frac{\eta_S \dot{\gamma}}{1 + W_i^2(1 - C_N^2)}$$
$$C_N(\dot{\gamma}) = 1 - \xi(\dot{\gamma})$$

where $\tau_{12}$ represents a shear viscosity of the molding resin.

In some embodiments, the effective factor is determined by using an experimental data of a first normal stress difference and a second normal stress difference represented by an expression:

$$N_1 = 2Wi\tau_{12}$$
$$N_2 = -\frac{\xi}{2}N_1$$

where $\tau_{12}$ represents a shear viscosity of the molding resin.

In some embodiments, the first normal stress difference is related to the shear viscosity of the molding resin.

In some embodiments, the second normal stress difference has a non-zero value.

In some embodiments, the molding resin comprises polystyrene resin.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
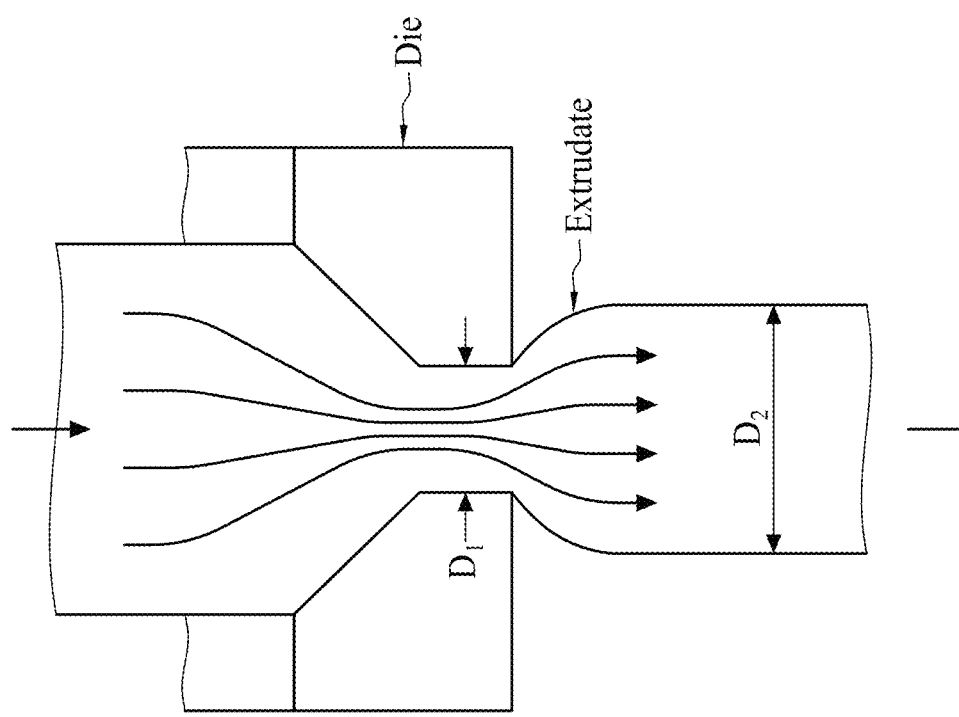
FIG. 1 shows an experimental observation of the die swell with an extrudate cross-section which is greater than a die cross-section.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

The present disclosure is directed to a molding system for preparing an injection-molded article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Injection molding is a technology commonly used for high-volume manufacturing of parts made of synthetic resin, most commonly made of thermoplastic polymers. During a repetitive injection-molding process, a plastic resin, most often in the form of small beads or pellets, is introduced into an injection-molding machine that melts the resin beads under heat, pressure, and shear. The now-molten resin is forcefully injected into a mold cavity having a particular cavity shape. The injected plastic is held under pressure in the mold cavity, cooled, and then removed as a solidified part having a shape that essentially duplicates the cavity shape of the mold.

Polymers/Plastics applications can be found in almost all areas of everyday living due to their versatility as an economically attractive option in the manufacturing industry. Viscoelasticity (VE) is a primary property of polymer materials that exhibit both "viscous" and "elastic" characteristics. Polymer materials can be processed by fast, highly-automated methods, such as injection molding. Thickness varying channels such as contraction channels formed with dies are widely used in production of injection-molding products. The die well effect or extrudate swell is a complex viscoelastic phenomenon. As shown in FIG. 1, die swell can be experimentally observed as an extrudate with a cross-section $D_2$ which is greater than a die cross-section $D_1$. The die swell ratio, defined as $D_2/D_1$, is increased with the average flow rate or the apparent shear rate (See, for example, Bird, R. B., R. C. Armstrong, and O. Hassager, Dynamics *of Polymeric Liquids: Fluid Mechanics* (Wiley-Interscience, New York, 1987); Morrison, F. A., *Understanding Rheology* (Oxford University, 2001); the entirety of the above-mentioned publication is hereby incorporated by reference herein and made a part of this specification).

A typical injection-molding procedure comprises four basic operations: (1) heating the plastic resin in the injection-molding machine to allow it to flow under pressure; (2) injecting the melted plastic resin into a mold cavity or cavities defined between two mold halves that have been closed; (3) allowing the plastic resin to cool and harden in the cavity or cavities while under pressure; and (4) opening the mold halves to cause the cooled part to be ejected from the mold. In the conventional injection molding of synthetic resin by an injection-molding machine, the weight of the injected synthetic resin varies with the molten resin pressure, the molten resin specific volume, the molten resin temperature and other molten resin conditions. Therefore, it is difficult to form products of a consistent quality.

In general, the setting of molding conditions of the injection-molding machine requires a large number of trial molding operations and a lengthy setting time because the setting work largely depends on the know-how and experience of an operator of the injection-molding machine, and various physical values affect one another as well.

To control the quality of the molded products, a deep understanding of complicated flow fields is critical. Computer-aided engineering (CAE) software provides realistic simulation and predictive analysis for complex flows of complex fluids. In the academic research of fluid mechanics and rheology, nonlinear viscous models of the generalized Newtonian fluids (GNF) have been available in polymer processing flows. However, with these techniques it is difficult to simulate the viscoelastic behaviors encountered in the die swell. Rheological researchers have developed viscoelastic constitutive equations of the stress tensor for polymer liquids. The first and second normal stress differences, $N_1$ and $N_2$, are important material functions of viscoelastic fluids under simple shear flow (See, for example, Bird, R. B., R. C. Armstrong, and O. Hassager, Dynamics *of Polymeric Liquids: Fluid Mechanics* (Wiley-Interscience, New York, 1987); Morrison, F. A., *Understanding Rheology* (Oxford University, 2001); the entirety of the above-mentioned publication is hereby incorporated by reference herein and made a part of this specification). The White-Metzner constitutive equation is a nonlinear viscoelastic model with the relaxation time function, which is related to the GNF shear viscosity and the modulus (See, for example, Morrison, F. A., *Understanding Rheology* (Oxford University, 2001); White, J. L. and A. B. Metzner, "Development of Constitutive Equations for Polymeric Melts and Solutions," J Appl Polym Sci 7 867-1889 (1963); the entirety of the above-mentioned publication is hereby incorporated by reference herein and made a part of this specification). In practice, however, this model has difficulties simulating the die swell. There is a numerical divergent issue due to the strain hardening of extension viscosity with at high extension rates. In addition, the modulus parameter is not experimentally determined since the relaxation time is not easy to be measured. The first normal stress difference can be given, but the second one is not described. Therefore, the present disclosure proposes modifications to the White-Metzner constitutive equation to simulate the die swell effect.

The actual flow of polymer melts is transient, non-Newtonian and non-isothermal, with frozen layers building up as the complex mixture flows through the mold cavity. The governing equations of the fluid mechanics include the equation of continuity, the equation of motion, and the equation of energy to describe the transient and non-isothermal flow motion as follows:

$$\frac{\partial \rho}{\partial t} + \nabla \cdot \rho u = 0 \tag{1}$$

$$\frac{\partial}{\partial t}(\rho u) + \nabla \cdot (\rho u u) = -\nabla P + \nabla \cdot \tau + \rho g \tag{2}$$

-continued $$\rho C_P\left(\frac{\partial T}{\partial t}+u\cdot\nabla T\right)=\nabla\cdot(k\nabla T)+\tau:D \quad (3)$$

where ρ represents the density; u represents the velocity vector; t represents the time; T represents the extra stress tensor; ∇u represents the velocity gradient tensor (velocity gradient distribution); D represents the rate-of-deformation tensor (i.e., symmetric tensor of ∇u); g represents the acceleration vector of gravity; p represents the pressure; $C_p$ represents the specific heat; T represents the temperature; and k represents the thermal conductivity.

The extra stress tensor τ is defined by the generalized Newtonian fluid (GNF) viscous model for polymer melts:

$$\tau=2\eta_S(T,P,\dot{\gamma})D \quad (4)$$

In general, the Cross-William-Landel-Ferry (Cross-WLF) flow curve model has been used to describe the shear viscosity $\eta_S$ as a function of the temperature T, pressure P, and strain rate $\dot{\gamma}$.

Furthermore, the flow curves of shear viscosity dominate the flow behaviors of a variety of materials. The Cross-WLF model used in polymer rheology and processing simulations can describe complex viscosity behaviors, including viscosity varying with shear rate for the Cross model and the zero-shear-rate viscosity, depending on temperature and pressure for the WLF model (See, for example, Cross, M. M., "Relation between Viscoelasticity and Shear-Thinning Behaviour in Liquids," Rheol Acta 18 609-614 (1979); the entirety of the above-mentioned publication is hereby incorporated by reference herein and made a part of this specification):

$$\eta_S(\dot{\gamma}, T, P) = \frac{\eta_0(T, P)}{1+\left(\frac{\eta_0\dot{\gamma}}{\tau^*}\right)^{1-n}} \quad (5)$$

$$\eta_0(T, P) = D_1\exp\left(\frac{-A_1(T-T_c)}{A_2+(T-T_c)}\right) \quad (6)$$

$$T_c = D_2 + D_3 P \quad (7)$$

$$A_2 = \tilde{A}_2 + D_3 P \quad (8)$$

where n, $\tau^*$, $A_1$, $\tilde{A}_2$, $D_1$, $D_2$ and $D_3$ represent parameters determined by fitting to related experimental data.

The White-Metzner viscoelastic constitutive equation is a nonlinear model, as follows (See, for example, Morrison, F. A., *Understanding Rheology* (Oxford University, 2001); White, J. L. and A. B. Metzner, "Development of Constitutive Equations for Polymeric Melts and Solutions," J Appl Polym Sci 7 867-1889 (1963); the entirety of the above-mentioned publication is hereby incorporated by reference herein and made a part of this specification):

$$\lambda(\dot{\gamma})\overset{\Delta}{\tau}+\tau = 2\eta_S(\dot{\gamma})D \quad (9)$$

$$\lambda(\dot{\gamma}) = \frac{\eta_S(\dot{\gamma})}{G_0} \quad (10)$$

$$\overset{\nabla}{\tau} = \frac{\partial \tau}{\partial t}+u\cdot\nabla\tau-\nabla u\cdot\tau-\tau\cdot\nabla u^T \quad (11)$$

where τ represents a stress tensor (stress distribution), $\overset{\nabla}{\tau}*$ represents the effective upper convected time derivative of the stress tensor (the rate of change of the stress distribution), Wi($\dot{\gamma}$) represents the Weissenberg number, $\eta_W(\dot{\gamma})$ represents the weighted viscosity distribution of the molding resin, D represents a rate of deformation of the molding resin, $\dot{\gamma}$ represents a shear rate of the molding resin, λ($\dot{\gamma}$) represent the relaxation time function; $\eta_S(\dot{\gamma})$ represent the shear viscosity function with respect to the shear rate; $G_0$ represent the modulus parameter; and $\overset{\nabla}{\tau}$ represents the upper convected time derivative of the extra stress tensor.

In the White-Metzner model, the parameter $G_0$ is not experimentally determined since the relaxation time is not easily measured. $G_0$ varies from 105 to 107 dyne/cm2, and is generally close to 106 dyne/cm2. Although the first normal stress difference N1 of the viscoelastic material function can be derived, the second normal stress difference is not described (N2=0) by this model, $$\tau = \begin{bmatrix} \tau_{11} & \tau_{12} & \tau_{13} \\ \tau_{12} & \tau_{22} & \tau_{23} \\ \tau_{13} & \tau_{23} & \tau_{33} \end{bmatrix} \quad (12)$$

$$N_1 = \tau_{11} - \tau_{22} \quad (13)$$

$$N_2 = \tau_{22} - \tau_{33} \quad (14)$$

Figure 2:
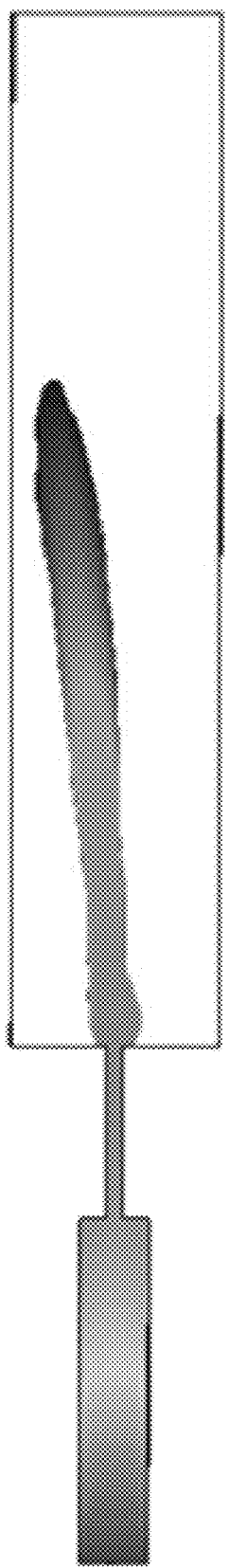
FIG. 2 shows a planar extrusion flow simulation of the die swell effect of polystyrene fluid at a slow extrusion flow, using the traditional White-Metzner model.
Figure 3:
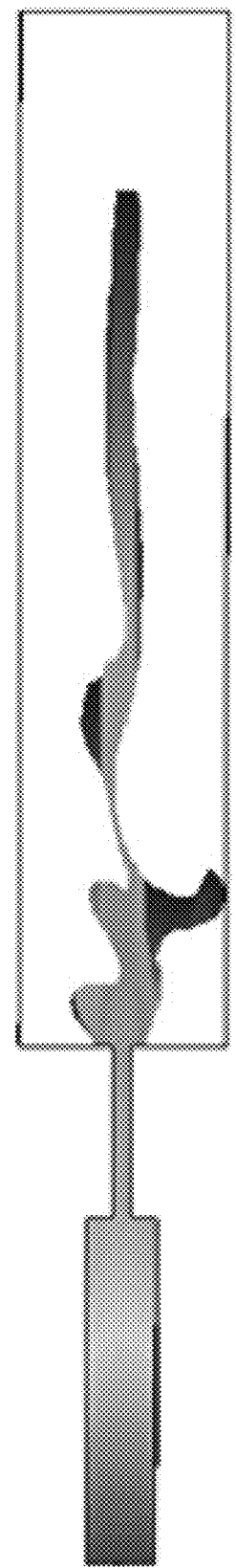
FIG. 3 shows a planar extrusion flow simulation of the die swell effect of polystyrene fluid at a fast extrusion flow, using the traditional White-Metzner model.

FIG. 2 shows a planar extrusion flow simulation of the die swell effect of polystyrene fluid at a slow extrusion flow of 10 cc/sec, using the traditional White-Metzner model. FIG. 3 shows a planar extrusion flow simulation of the die swell effect of polystyrene fluid at a fast extrusion flow of 80 cc/sec, using the traditional White-Metzner model. The planar extrusion flow simulations were implemented on a commercial injection-molding simulation software, Moldex3D (CoreTech System Co. of Taiwan). When the traditional unmodified White-Metzner model is used to simulate die swell of a molding material such as polystyrene fluid, simulation errors can occur especially at the fast extrusion flow of 80 cc/sec (FIG. 3). Therefore, it is crucial that modifications be made to the traditional White-Metzner model for effective simulation of the die swell effect.

In accordance with some embodiments of the present disclosure, several modifications are proposed for the traditional White-Metzner constitutive equation:

$$\lambda(\dot{\gamma})\overset{\nabla}{\tau}*+\tau=2\eta_s(\dot{\gamma})D \quad (15)$$

The key modifications to the traditional White-Metzner model which are proposed by the present disclosure are as follows:

(I) The Effective Upper Convected Time Derivative of the Extra Stress Tensor $$\overset{\nabla}{\tau}* = \frac{D\tau}{Dt}-\nabla L\cdot\tau-\tau\cdot L^T \quad (16)$$

$$L = \nabla u - \xi D \quad (17)$$

where ∇u represents the standard velocity gradient tensor (the rate of deformation), L represents an effective velocity gradient tensor (velocity gradient distribution), ξ represents an effective factor, and ξD) represents an retardation effect to the rate of deformation (slowing down the predicted rate of deformation).

$$\xi(\dot{\gamma}) = \frac{\xi_0}{\left[1+\left(\frac{\dot{\gamma}}{\dot{\gamma}_{XC}}\right)^2\right]^{N_X}} \tag{18}$$

where $\xi_0$, $\dot{\gamma}_{XC}$, and $N_x$ represent parameters determined by fitting to an experimental data of the first and second normal stress differences N1 and N2. In some embodiments, the above relation of the effective factor $\xi$ improves to predict the rate of change of the stress distribution at low shear rate region.

Figure 4:
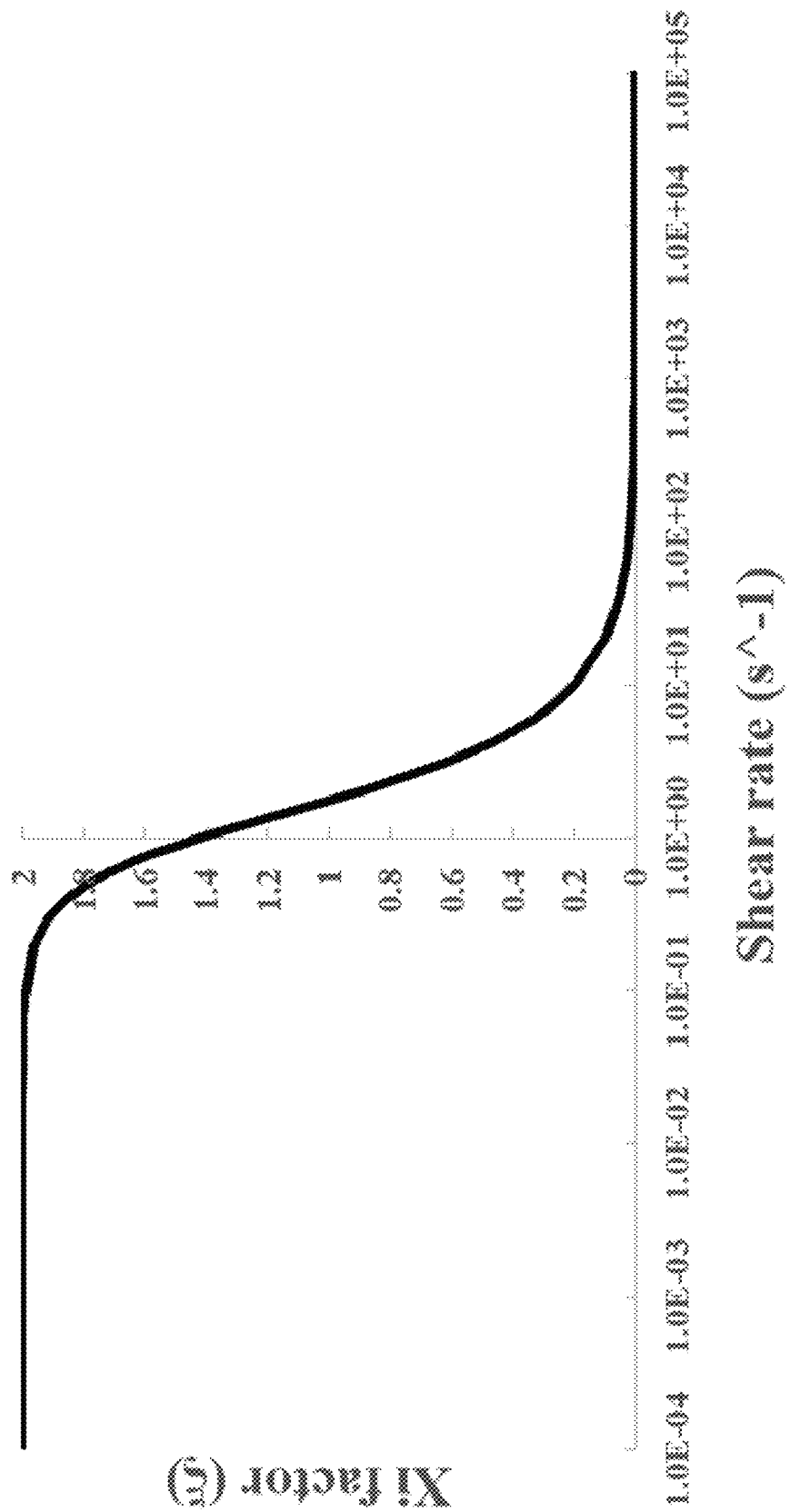
FIG. 4 shows the variation of the effective factor (ξ) with respect to the shear rate in accordance with some embodiments of the present disclosure.
Figure 5:
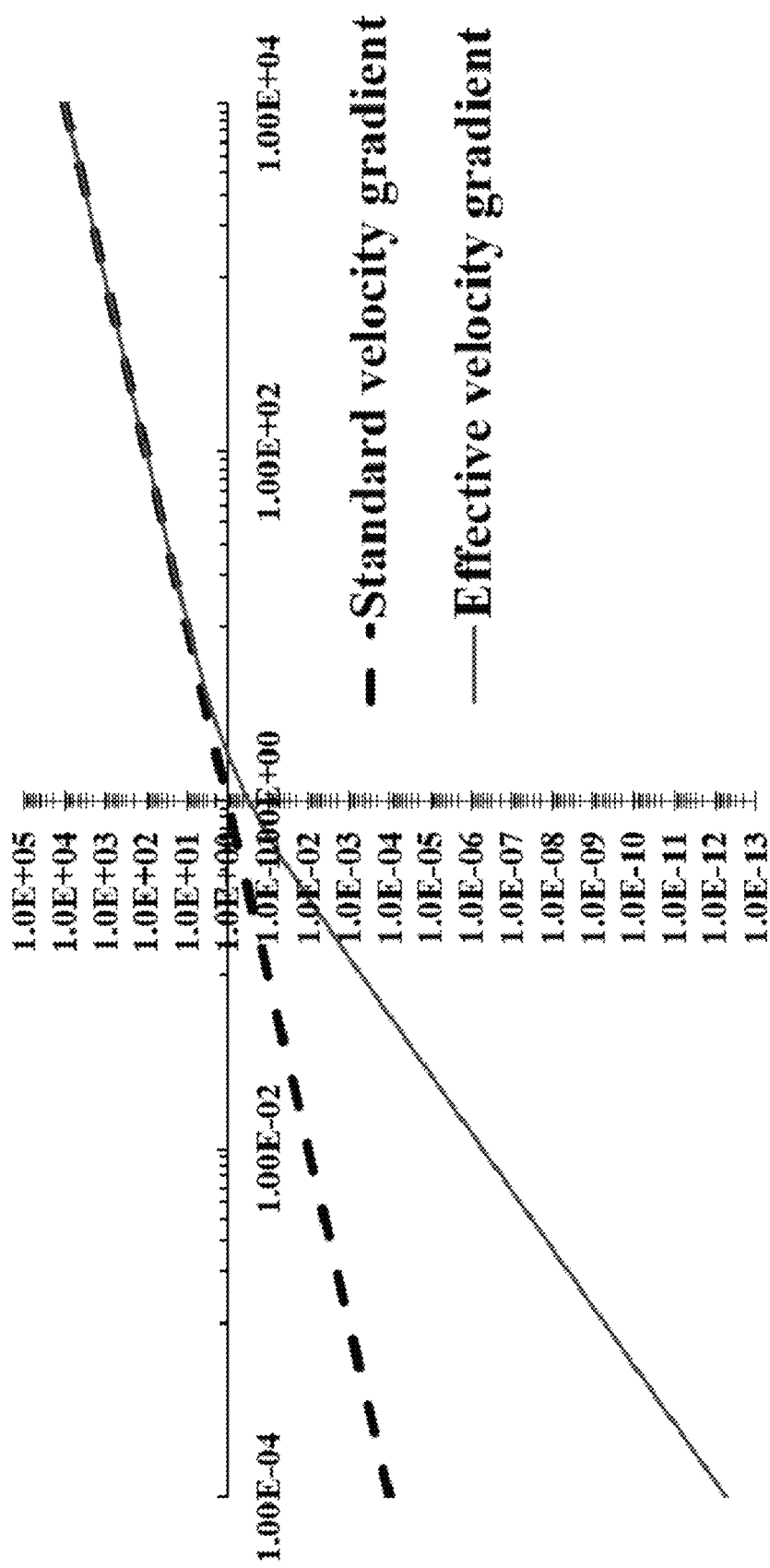
FIG. 5 shows the retardation effect to the rate of deformation (slowing down the rate of deformation) by the velocity gradient from the effective factor in accordance with some embodiments of the present disclosure.

FIG. 4 shows the variation of the effective factor $\xi$ with respect to the shear rate in accordance with some embodiments of the present disclosure, and FIG. 5 shows the retardation effect to the rate of deformation (slowing down the rate of deformation) by the velocity gradient from the effective factor in accordance with some embodiments of the present disclosure. As clearly shown from FIG. 4 and FIG. 5, the effective factor $\xi$ takes effect at the low shear rate region, decreasing the predicted velocity gradient.

(II) The GNF Shear Viscosity is Replaced by the GNF-X Weighted Viscosity

Figure 6:
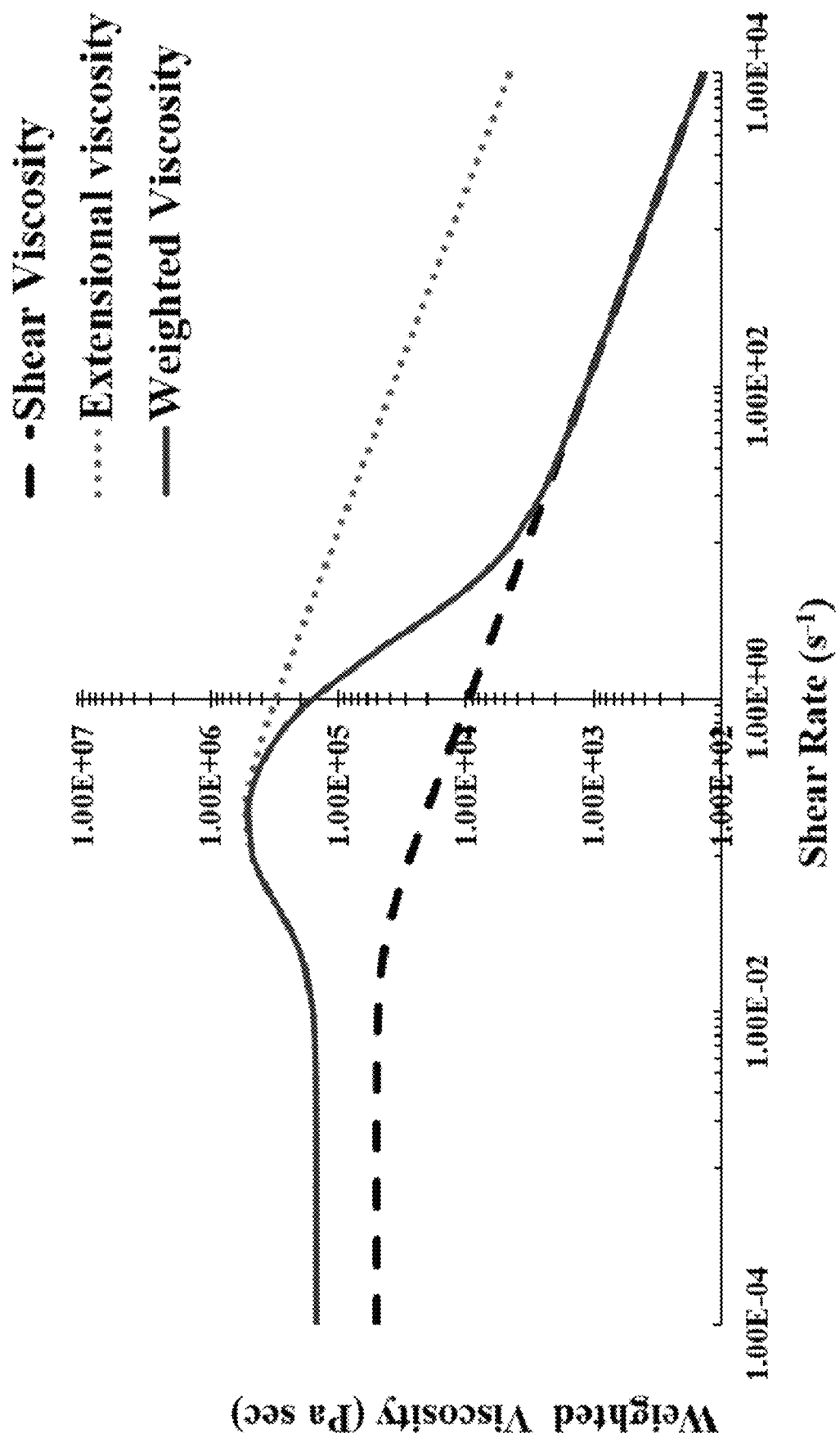
FIG. 6 shows the variation of three viscosity models with respect to the shear rate in accordance with some embodiments of the present disclosure.

Tseng recently derived a weighted viscosity $\eta_W(\dot{\gamma})$ in nature with the coexistence of shear and extensional flow; this is called the extended GNF (GNF-X) model (See, for example, Tseng, H.-C., "A Revisitation of Generalized Newtonian Fluids," J Rheol 64 493 (2020); the entirety of the above-mentioned publication is hereby incorporated by reference herein and made a part of this specification). The GNF-X model can avoid the divergent issue of the extension viscosity in the White-Metzner model:

$$\eta_W = (1-W)\eta_S + W\eta_E \tag{19}$$

$$W = \frac{\dot{\gamma}_E^2}{\dot{\gamma}_T^2} \tag{20}$$

$$\dot{\gamma}_T^2 = \dot{\gamma}_S^2 + \dot{\gamma}_E^2 \tag{21}$$

where W represents a weighting function, $\eta_S$ represents a shear viscosity of the molding resin, $\eta_E$ represents an extension viscosity of the molding resin, $\dot{\gamma}_T$ represents a total strain rate of the molding resin, $\dot{\gamma}_S$ represents a characteristic shear rate of the molding resin, and $\dot{\gamma}_E$ represents a characteristic extension rate of the molding resin. In some embodiments, the above relation of the weighted viscosity distribution of the molding resin takes into consideration the extension viscosity of the molding resin in addition to the conventional shear viscosity of the molding resin, improving the prediction of the real viscosity of the molding resin in the die swell structure of the mold cavity. FIG. 6 shows the variation of three viscosity models with respect to the shear rate in accordance with some embodiments of the present disclosure. The prior art only takes into consideration of the shear viscosity when performing the molding simulation; in contrast, the present disclosure proposes the weighted viscosity model incorporating both the shear viscosity and the extension viscosity of the molding resin. As clearly shown in FIG. 6, taking into consideration the extension viscosity of the molding resin in addition to the conventional shear viscosity of the molding resin increases the overall viscosity of the molding resin at the low shear rate region.

(III) The Relaxation Time $\lambda$ is Related to the Weissenberg Number Wi

In rheology, the dimensionless Weissenberg number Wi is defined by the characteristic relaxation time $\lambda$ and the shear rate $\dot{\gamma}$:

$$Wi = \lambda\dot{\gamma} \tag{22}$$

and so:

$$\lambda(\dot{\gamma}) = \frac{Wi(\dot{\gamma})}{\dot{\gamma}} \tag{23}$$

The Weissenberg number can be written as a function of the shear rate:

$$Wi(\dot{\gamma}) = \frac{Wi_0}{\left[1+\left(\frac{\dot{\gamma}}{\dot{\gamma}_{WC}}\right)^{-2}\right]^{N_W}} \tag{24}$$

where $Wi_0$, $\dot{\gamma}_{WC}$, and $N_W$ represent parameters determined by fitting to an experimental data of the first normal stress difference N1. In some embodiments, the Weissenberg number represents the viscoelastic property of the molding resin, and the above relation increases the viscous weight of the Weissenberg number, improving the prediction of the Weissenberg number at low shear rate region.

Figure 7:
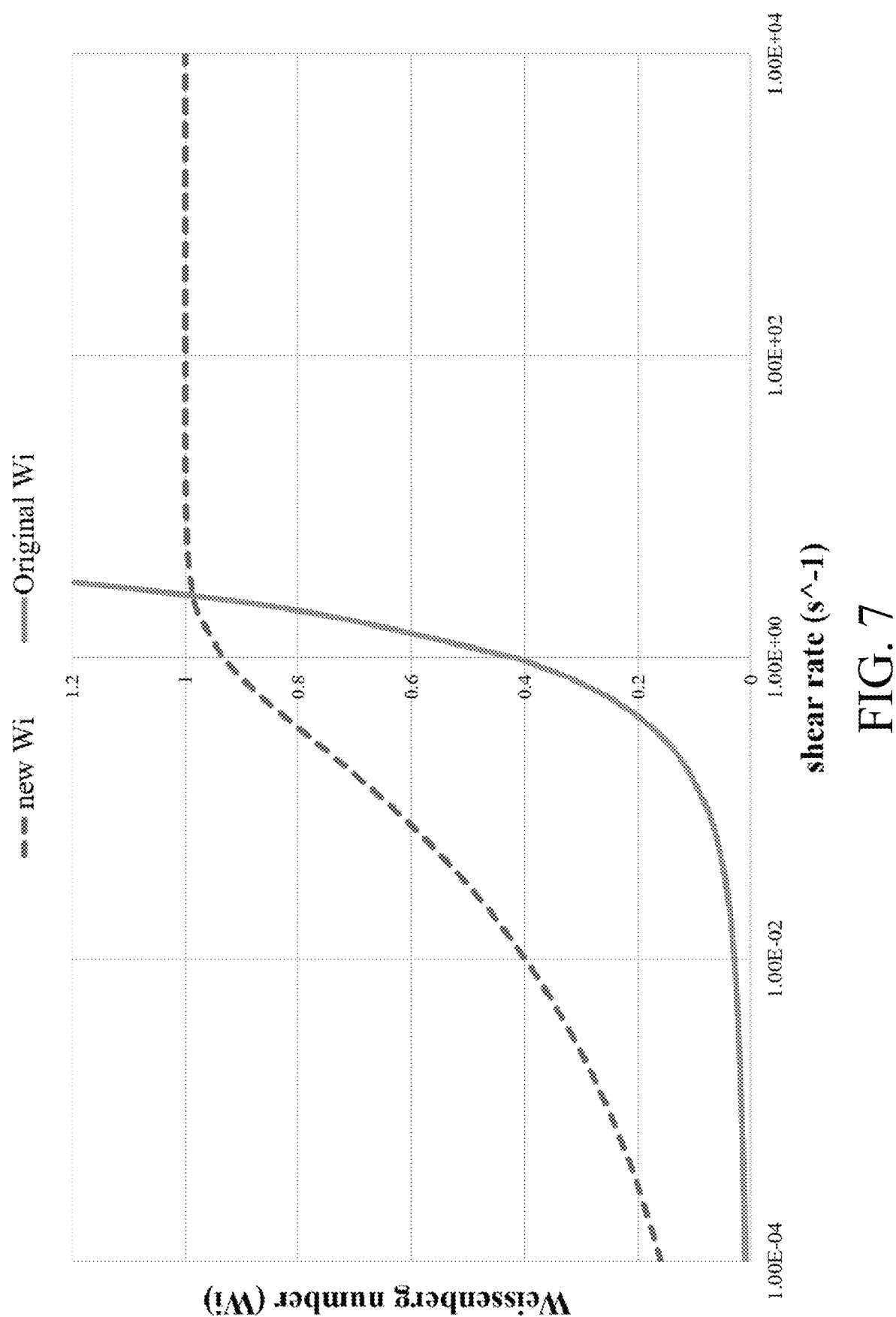
FIG. 7 shows the variation of the Weissenberg number (viscoelastic property of the molding resin) with respect to the shear rate in accordance with some embodiments of the present disclosure.

FIG. 7 shows the variation of the Weissenberg number (viscoelastic property of the molding resin) with respect to the shear rate in accordance with some embodiments of the present disclosure. As clearly shown in FIG. 7, the proposed new model for the Weissenberg number of the present disclosure can predict the viscous property of the molding resin both at the low shear rate and the high shear rate (from 1.00 E−2 to 1.00 E+2), while the conventional model can only predict the viscous property of the molding resin at a relatively small shear rate region (from 1.00 E−4 to 1.00 E0). In particular, as the shear rate is greater than 1.0, the conventional model provides a Weissenberg number greater than 1.0, which is physically unreasonable and incorrect.

Accordingly, the present disclosure proposes a modified White-Metzner model as follows:

$$\frac{Wi(\dot{\gamma})}{\dot{\gamma}}\overset{\nabla}{\tau}^* + \tau = 2\eta_W(\dot{\gamma})D \tag{25}$$

where $\tau$ represents a stress tensor, $\overset{\nabla}{\tau}^*$ represents the effective upper convected time derivative of the stress tensor, $Wi(\dot{\gamma})$ represents the Weissenberg number, $\eta_W(\dot{\gamma})$ represents the weighted viscosity of the molding resin, D represents a rate of deformation of the molding resin, and $\dot{\gamma}$ represents the shear rate of the molding resin.

Moreover, the first and second normal stress differences N1 and N2 of viscoelastic material functions can be derived under simple shear flow:

$$N_1 = 2Wi\tau_{12} \tag{26}$$

$$N_2 = -\frac{\xi}{2}N_1 \tag{27}$$

where the shear stress and the parameter are given $$\tau_{12} = \frac{\eta_S \dot{\gamma}}{1 + W_i^2(1 - C_N^2)}$$

$$C_N(\dot{\gamma}) = 1 - \xi(\dot{\gamma})$$

It should be noted that the first normal stress difference N1 is related to a shear viscosity $\tau_{12}$ of the molding resin. In addition, the second normal stress difference N2 has a non-zero value for the modified White-Metzner model, and this improves upon one of the traditional White-Metzner model's shortcomings, where N2=0. Also, both of the first and second normal stress differences N1 and N2 can be experimentally measured. Thus, the primary parameters, the Weissenberg number Wi and the effective factor ξ, can be determined by the first and second normal stress differences N1 and N2. In some embodiments of the present disclosure, the modified White-Metzner model can be incorporated into a process flow of a commercial injection-molding simulation software, such as Moldex3D.

Figure 8:
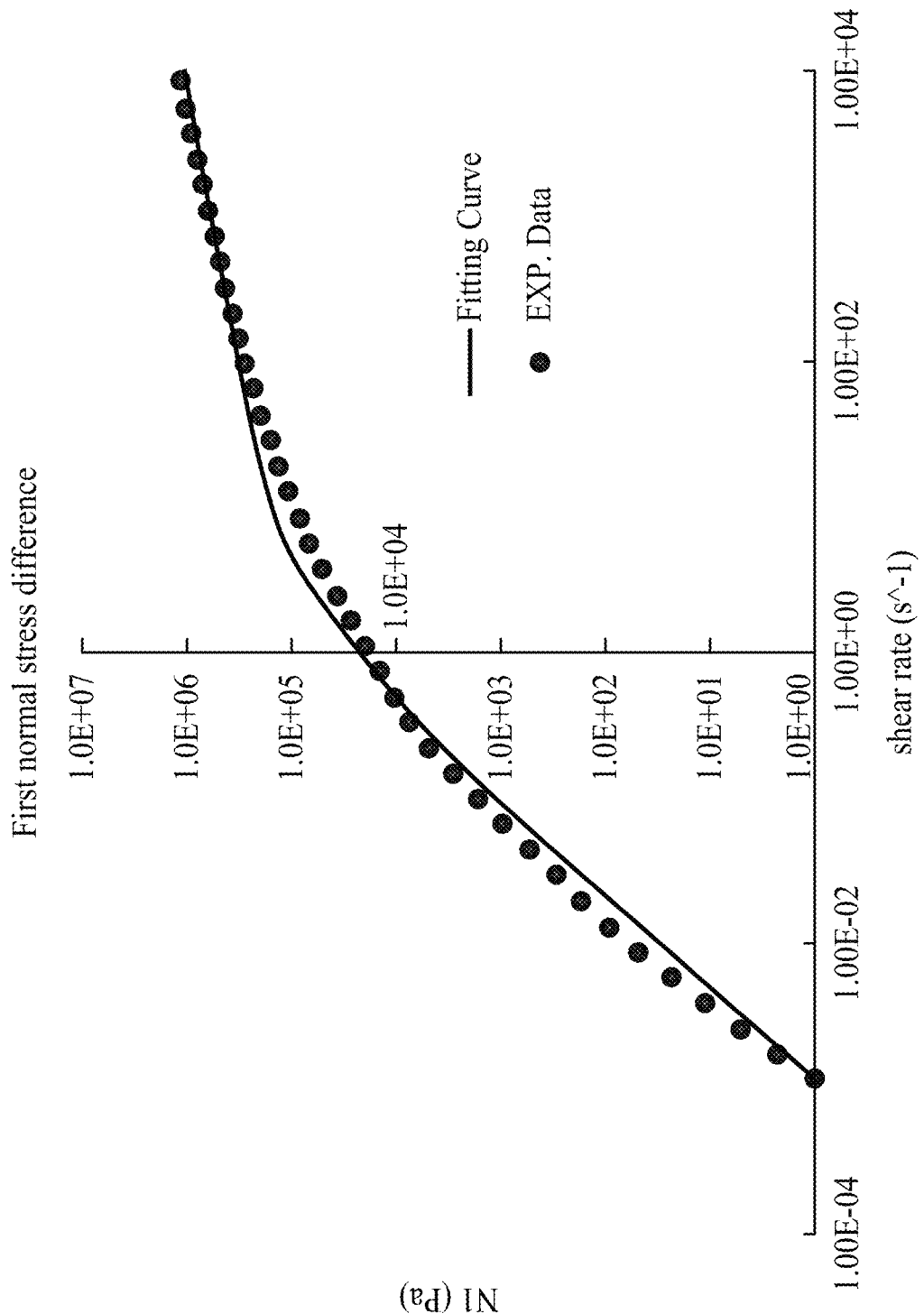
FIG. 8 shows a first normal stress difference in relation to shear rate of the polystyrene fluid, including an experimental data and a fitting curve in accordance with some embodiments of the present disclosure.
Figure 9:
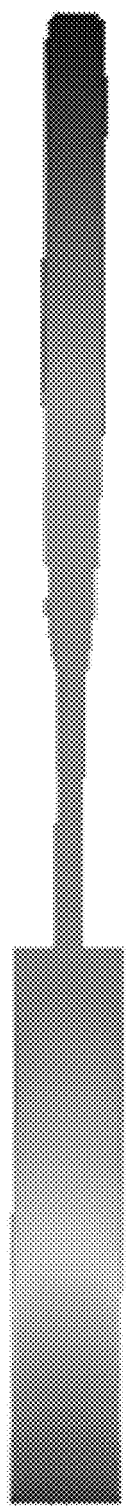
FIG. 9 shows a planar extrusion flow simulation of the die swell effect of the polystyrene fluid at a slow extrusion flow, using the modified White-Metzner model in accordance with some embodiments of the present disclosure.
Figure 10:
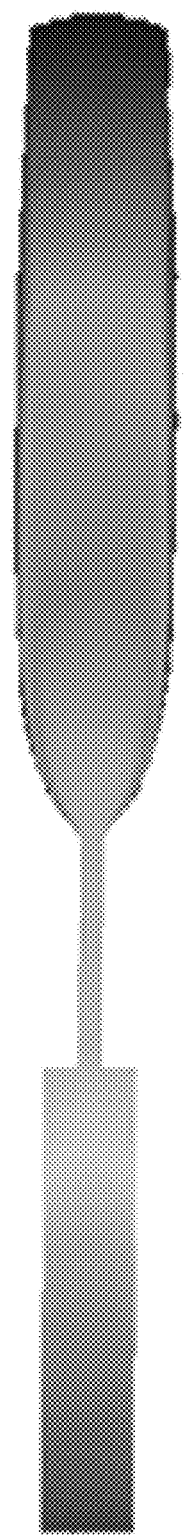
FIG. 10 shows a planar extrusion flow simulation of the die swell effect of the polystyrene fluid at a fast extrusion flow, using the modified White-Metzner model in accordance with some embodiments of the present disclosure.

In some embodiments of the present disclosure, a molding material of interest is the polystyrene melt, for example. The planar extrusion flow simulations of the polystyrene fluid were performed via a commercial simulation software, Moldex3D (CoreTech System Co. of Taiwan). In embodiments of the present disclosure, the modified White-Metzner constitutive equation for viscoleastic fluids has been incorporated in Moldex3D. The primary parameters of the modified White-Metzner model, the Weissenberg number Wi and the effective factor ξ, can be determined by experimental data. FIG. 8 shows the first normal stress difference $N_1$ in relation to shear rate of the polystyrene fluid, including an experimental data and a fitting curve. The result shown in FIG. 8 can determine the parameter of the Weissenberg number Wi. Referring to the experimental data of the ratio of normal stresses difference $(-N_2/N_1)$ from the work of Schweizer (See, for example, Schweizer, T., "Measurement of the First and Second Normal Stress Differences in a Polystyrene Melt with a Cone and Partitioned Plate Tool," Rheol Acta 41 337-344 (2002); the entirety of the above-mentioned publication is hereby incorporated by reference herein and made a part of this specification), the effective factor ξ is found. Accordingly, these parameters Wi and ξ are inputted to the modified White-Metzner constitutive equation in Moldex3D. FIG. 9 shows a planar extrusion flow simulation of the die swell effect of the polystyrene fluid at a slow extrusion flow of 10 cc/sec, using the modified White-Metzner model. FIG. 10 shows a planar extrusion flow simulation of the die swell effect of the polystyrene fluid at a fast extrusion flow of 80 cc/sec, using the modified White-Metzner model. As shown in FIG. 9 and FIG. 10, it is clearly observable that the die swell ratio is increased with the average flow rate or the wall shear rate, and accurate simulations can be obtained by using the modified White-Metzner model. Therefore, such simulations are successful in demonstrating that the modifications proposed by the present disclosure can effectively improve the traditional White-Metzner model.

Figure 11:
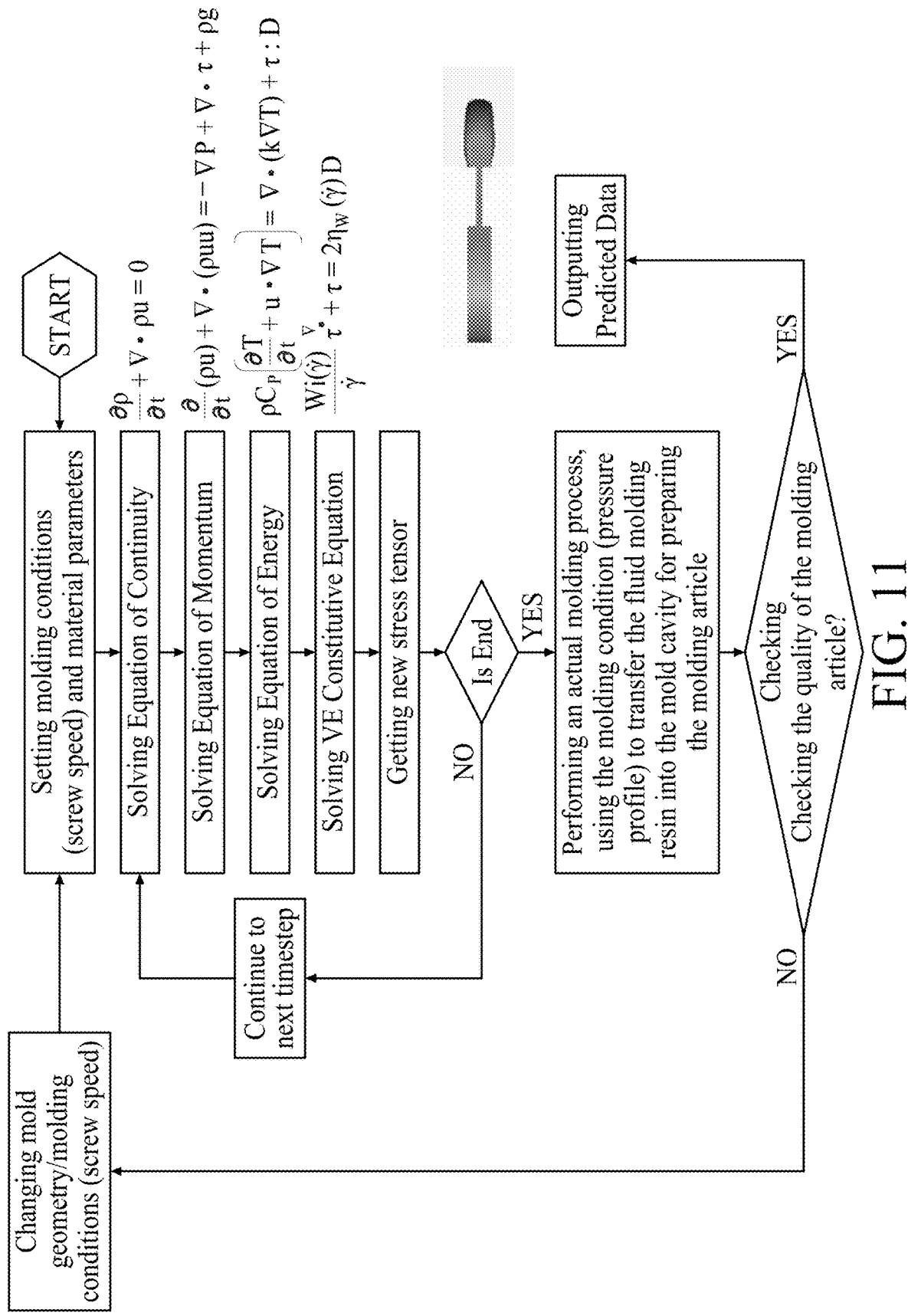
FIG. 11 is a flowchart showing an injection-molding simulation operation in accordance with some embodiments of the present disclosure.

FIG. 11 is a flowchart showing an injection-molding simulation operation in accordance with some embodiments of the present disclosure. As shown in FIG. 11, the CAE simulation software can calculate the stress tensor τ by applying the modified White-Metzner constitutive equation for the subsequent die swell effect analysis. In addition, after calculating the stress tensor τ, if the numerical calculation results are not convergent, the fiber parameters or the molding conditions may be adjusted, and another simulation can be performed to obtain updated calculation results. By applying the modified White-Metzner constitutive equation, the die swell effect of the molding resin can be effectively simulated.

In some embodiments, the simulation operation may be repeated with different boundary conditions to obtain a feasible molding condition (e.g., a screw speed with a flow rate for transferring desired amount of molding material into the mold cavity during the very short injection phase); then, in the actual molding step, the controller operates the molding machine (controlling the driving motor 230 to move the screw 220 at a predetermiend speed) with the feasible molding condition for transferring the fluid molding material into the mold cavity to perform an actual molding process for preparing the molding article. If the quality of the prepared molding article is different from the designed, the simulation operation may be further repeated with different boundary conditions to obtain another feasible molding condition (e.g., an updated screw speed with an updated flow rate for transferring desired amount of molding material into the mold cavity) in the subsequent actual molding step.

With continuing reference to FIG. 11, in injection-molding simulation operations, the governing equations of fluid mechanics that describe the transient flow behaviors are as follows:

$$\frac{\partial \rho}{\partial t} + \nabla \cdot \rho u = 0 \qquad (28)$$

$$\frac{\partial}{\partial t}(\rho u) + \nabla \cdot (\rho u u) = -\nabla P + \nabla \cdot \tau + \rho g \qquad (29)$$

$$\rho C_P\left(\frac{\partial T}{\partial t} + u \cdot \nabla T\right) = \nabla \cdot (k\nabla T) + \tau : D \qquad (30)$$

$$\frac{Wi(\dot{\gamma})}{\dot{\gamma}}\tau^{\nabla*} + \tau = 2\eta_W(\dot{\gamma})D \qquad (31)$$

where β represents the density; u represents the velocity vector; t represents the time; τ represents the extra stress tensor; ∇u represents the velocity gradient tensor (velocity gradient distribution); g represents the acceleration vector of gravity; p represents the pressure; $C_p$ represents the specific heat; T represents the temperature; k represents the thermal conductivity; $_\tau^{\nabla*}$ represents the effective upper convected time derivative of the extra stress tensor; Wi($\dot{\gamma}$) represents the Weissenberg number; $\eta_W(\dot{\gamma})$ represents the weighted viscosity of the molding resin; D represents a rate of deformation of the molding resin; and $\dot{\gamma}$ represents the shear rate of the molding resin.

Solving the governing equations (28)-(31) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives ∂/∂t in the governing equations (28)-(31) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 11 can be implemented using a commercial injection-molding simulation software, Moldex3D (CoreTech System Co. of Taiwan), to facilitate the orientation predictions of the fiberless molding resin.

In some embodiments, the simulating process may be repeated with different boundary conditions to obtain a feasible molding condition (e.g., a screw speed with a flow rate for transferring desired amount of molding material into the mold cavity); then, in the actual molding step, the controller operates the molding machine (control the driving motor 230 to move the screw 220 at a predetermiend screw speed) with the feasible molding condition for transferring the fluid molding material into the mold cavity to perform an actual molding process for preparing the molding article. If the size of the prepared molding article is different from the simulating result, the simulating process may be further repeated with different boundary conditions to obtain another feasible molding condition (e.g., an updated screw speed with an updated flow rate for transferring desired amount of molding material into the mold cavity) in the subsequent actual molding step.

Figure 12:
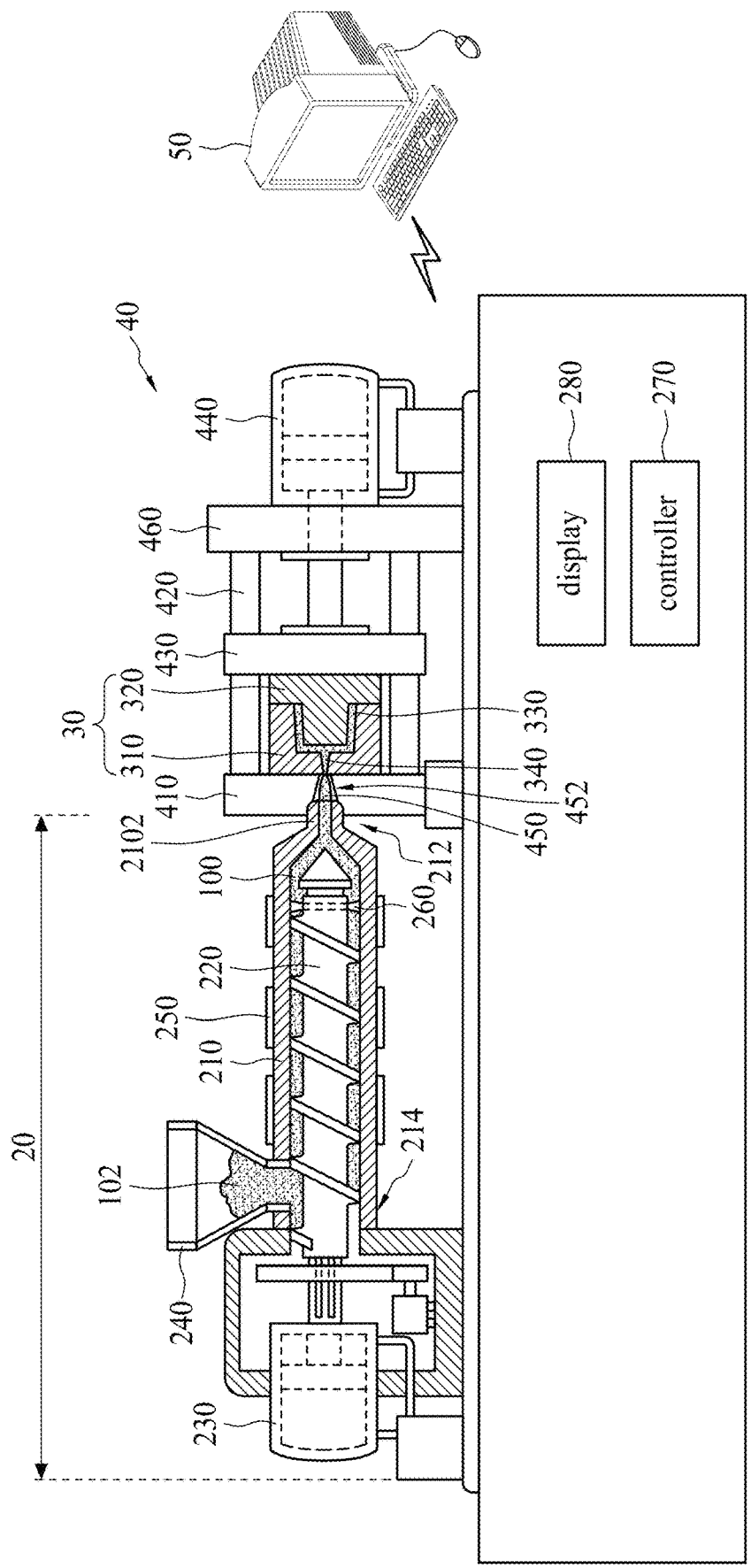
FIG. 12 is a schematic view of an injection-molding apparatus in accordance with some embodiments of the present disclosure.

FIG. 12 is a schematic view of an injection-molding apparatus 10 in accordance with some embodiments of the present disclosure. Referring to FIG. 12, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a is driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bush 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time. In some embodiments, the molding material 100 may be a molding resin such as polystyrene resin, for example.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on the tie bar 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the plastic granules 102 change phase from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The molding machine 110 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding to machine 20 by the on-site technicians particularly where the on-site technicians' intervention is required.

In some embodiments, the molding machine 20 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operating system capable of running general-purpose application software for assisting with the analysis and process of the performance data and for communicating with the controller 270 and the display 280 via communication ports of each.

Figure 13:
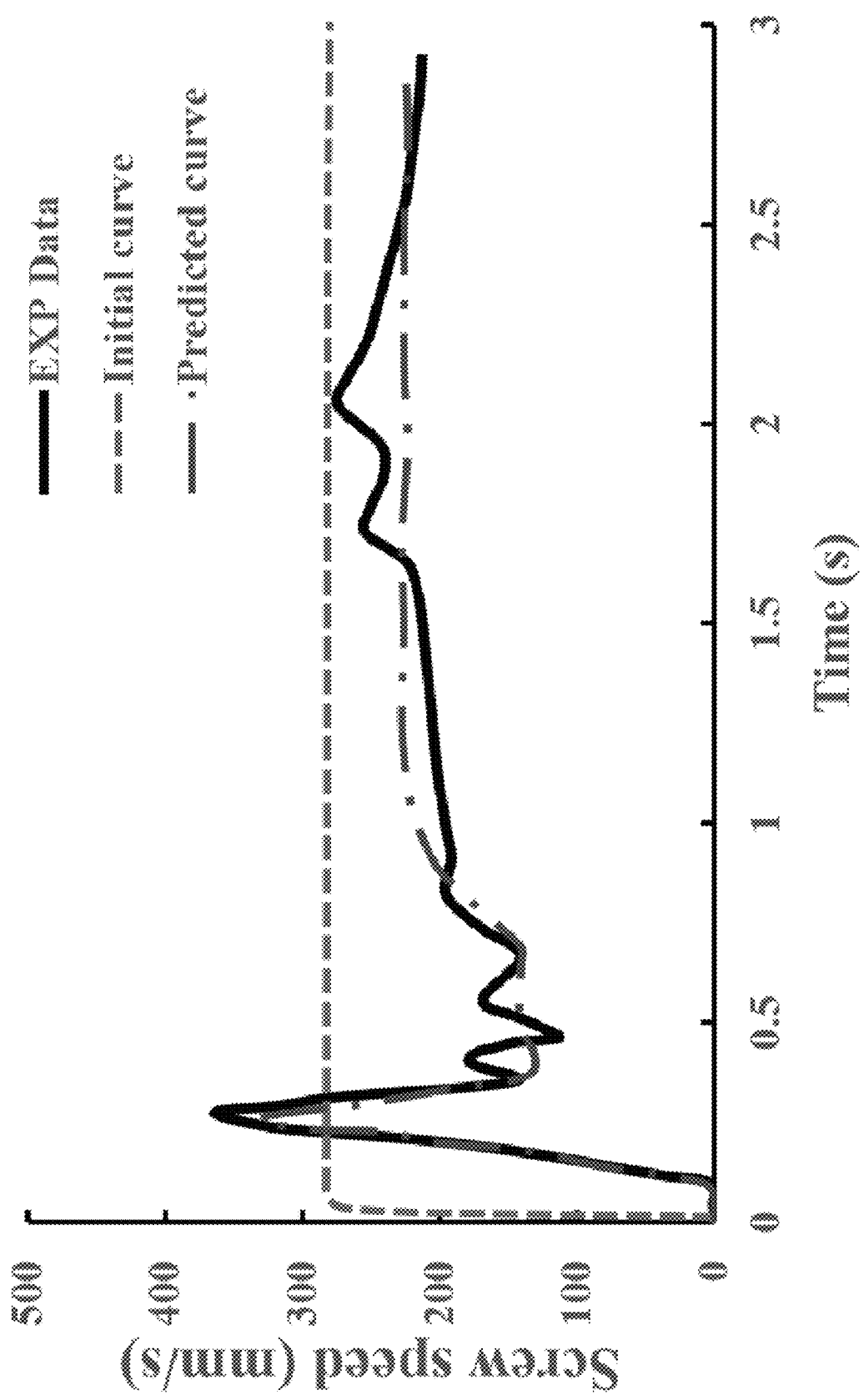
FIG. 13 is a chart showing the speed of the screw in accordance with some embodiments of the present disclosure

FIG. 13 is a chart showing the speed of the screw in accordance with some embodiments of the present disclosure. In some embodiments, different moving speeds (profiles) of the screw transfer different amounts of molding material at different flow rates into the mold cavity during the short injection phase. Referring back to FIG. 11, if the quality (size) of the prepared molding article is different from the designed, the simulation operation may be repeated with different boundary conditions (moving speeds) to obtain another feasible molding condition (e.g., an updated screw speed with an updated flow rate for transferring desired amount of molding material into the mold cavity) in the subsequent actual molding step.

Figure 14:
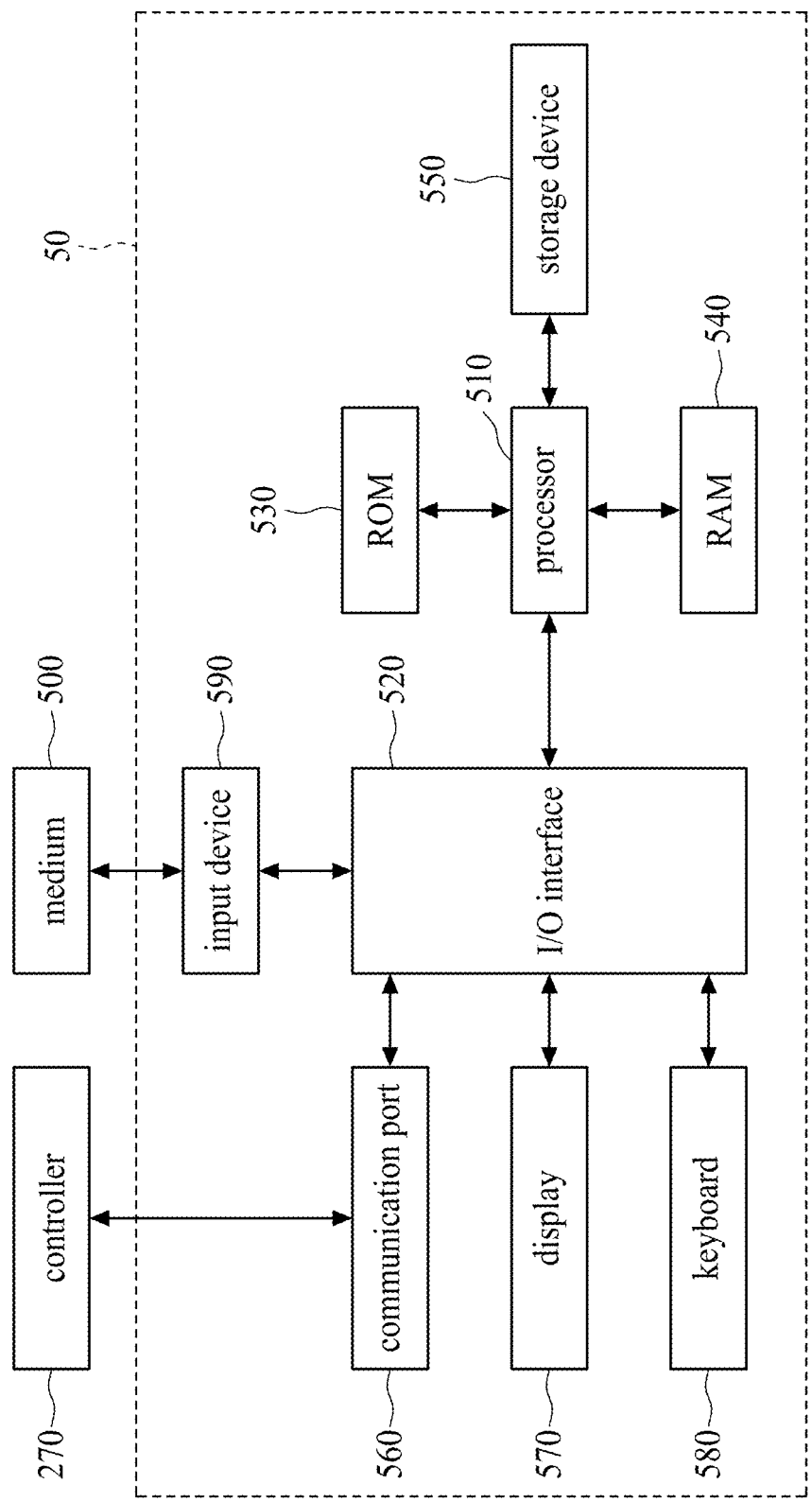
FIG. 14 is a functional block diagram of the computer in FIG. 12 in accordance with some embodiments of the present disclosure.

FIG. 14 is a functional block diagram of the computer 50 in FIG. 12. Referring to FIG. 14, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RANI 540 and the storage device 550 are to operably communicate with the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

The present disclosure provides a molding system for preparing an injection-molded article, comprising a molding machine, including a barrel, a screw mounted for moving within the barrel, a driving motor driving the screw to move a molding resin; a mold disposed on the molding machine and connected to the barrel of the molding machine to receive the molding resin, and having a mold cavity with a die swell structure for being filled with the molding resin; a processing module simulating a filling process of the molding resin from the barrel into the molding cavity based on a molding condition including a predetermined screw speed for the molding machine, wherein simulating the filling process of the molding resin is performed taking into consideration of a die swell effect of the molding resin; and a controller operably communicating with the processing module to receive the molding conditions and with the molding machine to control the driving motor of the molding machine based on the molding conditions to move the screw at the predetermined screw speed to transfer the molding resin at a corresponding flow rate to perform an actual molding process for preparing the injection-molded article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. A molding system for preparing an injection-molded article, comprising:
    a molding machine, including a barrel, a screw mounted for moving within the barrel, a driving motor driving the screw to move a molding resin;
    a mold disposed on the molding machine and connected to the barrel of the molding machine to receive the molding resin, and having a mold cavity with a die swell structure for being filled with the molding resin;
    a processing module simulating a filling process of the molding resin from the barrel into the molding cavity based on a molding condition including a predetermined screw speed for the molding machine, wherein simulating the filling process of the molding resin comprises simulating a die swell effect of the molding resin in the die swell structure by taking into consideration of an effective factor, a shear viscosity, an extension viscosity and a shear rate of the molding resin; and
    a controller operably communicating with the processing module to receive the molding conditions and with the molding machine to control the driving motor of the molding machine based on the molding conditions to move the screw at the predetermined screw speed to transfer the molding resin at a corresponding flow rate to perform an actual molding process for preparing the injection-molded article;
    wherein the processing module performs a model to simulate the die swell effect of the molding resin, and the model is represented by an expression:

$$\frac{Wi(\dot{\gamma})}{\dot{\gamma}} \stackrel{\nabla}{\tau}^* + \tau = 2\eta_W(\dot{\gamma})D$$

where $\tau$ represents a stress distribution, $\stackrel{\nabla}{\tau}^*$ represents a rate of change of the stress distribution, $Wi(\dot{\gamma})$ represents an viscoelastic property of the molding resin, $\eta_W(\dot{\gamma})$ represents the weighted viscosity distribution of the molding resin, D represents a rate of deformation of the molding resin, and $\dot{\gamma}$ represents the shear rate of the molding resin.

2. The molding system of claim 1, wherein the rate of change of the stress distribution is represented by an expression:

$$\stackrel{\nabla}{\tau}^* = \frac{D\tau}{Dt} - \nabla L \cdot \tau - \tau \cdot L^T$$

$$L = \nabla u - \xi D$$

where $\nabla u$ represents the standard velocity gradient distribution, L represents an effective velocity gradient distribution and $\xi$ represents the effective factor.

3. The molding system of claim 2, wherein the effective factor is related to the shear rate of the molding resin, and the effective factor is represented by an expression:

$$\xi(\dot{\gamma}) = \frac{\xi_0}{\left[1 + \left(\frac{\dot{\gamma}}{\dot{\gamma}_{XC}}\right)^2\right]^{N_X}}$$

where $\xi_0$, $\dot{\gamma}_{XC}$, and $N_X$ represent parameters determined by using an experimental data.

4. The molding system of claim 1, wherein the viscoelastic property of the molding resin is related to the shear rate of the molding resin, and the viscoelastic property of the molding resin is represented by an expression:

$$Wi(\dot{\gamma}) = \frac{Wi_0}{\left[1 + \left(\frac{\dot{\gamma}}{\dot{\gamma}_{WC}}\right)^{-2}\right]^{N_W}}$$

where $Wi_0$, $\dot{\gamma}_{WC}$, and $N_W$ represent parameters determined by using an experimental data.

5. The molding system of claim 1, wherein the weighted viscosity distribution of the molding resin is represented by an expression:

$$\eta_W = (1 - W)\eta_S + W\eta_E$$
$$W = \frac{\dot{\gamma}_E^2}{\dot{\gamma}_T^2}$$
$$\dot{\gamma}_T^2 = \dot{\gamma}_S^2 + \dot{\gamma}_E^2$$

where W represents a weighting function, $\eta_S$ represents the shear viscosity of the molding resin, $\eta_E$ represents the extension viscosity of the molding resin, $\dot{\gamma}_T$ represents a total strain rate of the molding resin, $\dot{\gamma}_S$ represents a characteristic shear rate of the molding resin, and $\dot{\gamma}_E$ represents a characteristic extension rate of the molding resin.

6. The molding system of claim 1, wherein the viscoelastic property of the molding resin is determined by using an experimental data of a first normal stress difference represented by an expression:

$$N_1 = 2Wi\tau_{12}$$

where $\tau_{12}$ represents the shear viscosity of the molding resin.

7. The molding system of claim 2, wherein the effective factor is determined by using an experimental data of a first normal stress difference and a second normal stress difference represented by an expression:

$$N_1 = 2Wi\tau_{12}$$
$$N_2 = -\frac{\xi}{2}N_1$$

where $\tau_{12}$ represents the shear viscosity of the molding resin, $$\tau_{12} = \frac{\eta_S \dot{\gamma}}{1 + Wi_I^2(1 - C_N^2)}$$

and the parameter $C_N(\dot{\gamma})$ is given $$C_N(\dot{\gamma}) = 1 - \xi(\dot{\gamma}).$$

8. The molding system of claim 7, wherein the first normal stress difference is related to the shear viscosity of the molding resin.

9. The molding system of claim 7, wherein the second normal stress difference has a non-zero value.

10. The molding system of claim 1, wherein the molding resin comprises polystyrene resin.

* * * * *